Patented Nov. 17, 1953

2,659,751

UNITED STATES PATENT OFFICE 2,659,751

ESTERS OF NITROACETIC ACID

Henry B. Hass and Henry Feuer, West Lafayette, Ind., assignors to Purdue Research Foundation, West Lafayette, Ind., a corporation of Indiana No Drawing. Application January 21, 1948, Serial No. 3,560

2 Claims. (Cl. 260—478)

The present invention relates to the synthesis of esters of nitroacetic acid and is more particularly concerned with a novel two-step synthesis from nitromethane whereby high yields of the esters are obtained directly from a dialkali metal salt of nitroacetic acid.

Esters of nitroacetic acid have recently come into prominence as intermediates in the preparation of amino acids. Certain of these esters have been known in the art for some time, having been previously prepared from the free nitroacetic acid and the particular alcohol desired to introduce the esterifying group. Nitroacetic acid is a very unstable compound, which decomposes rapidly, and consequently any procedure for the preparation of a nitroacetate which utilizes nitroacetic acid as an intermediate leaves much to be desired from the standpoint of overall yield, as well as being a rather tedious and dangerous procedure due to the said instability of the intermediate nitroacetic acid.

The common method of preparation of nitroacetic acid is through the basic condensation of two molecules of nitromethane, which procedure is productive of the dipotassium or other dialkali metal salt of the free acid. The postulated formula of dipotassium nitroacetate is KO.ON=CH—COOK and its assay shows it to contain a percentage (approximately 43.0%) corresponding to two potassium atoms. According to prior procedure, this salt was treated with a strong acid, such as sulfuric, to produce the free nitroacetic acid and the free acid then condensed with an alcohol such as methanol or ethanol to give the desired ester of nitroacetic acid. Previous investigators have been unable to synthesize nitroacetates directly from the dipotassium salt of nitroacetic acid with concentrated sulfuric acid and absolute ethanol, due to the decomposition rate of the freed acid which was supposedly faster than the rate of ester formation. (W. Steinkopf, Annalen, 1923, vol. 434, pages 21 to 29.)

It is an object of the present invention to provide a novel method for the synthesis of esters of nitroacetic acid. A further object of the present invention is the provision of a novel process for the preparation of esters of nitroacetic acid directly from a dialkali metal salt of nitroacetic acid without the necessity of proceeding through the unstable free nitroacetic acid. Another object of the invention is the provision of a novel method for the preparation of esters of nitroacetic acid in increased yields over those obtainable by previously employed processes. Other objects of the present invention will become apparent hereinafter.

We have now found that, by the proper selection of reactants and reaction conditions, we are able to synthesize an ester of nitroacetic acid directly from a dialkali metal salt of nitroacetic acid, thereby obviating the second step of the usual synthesis, and obviating entirely use of the free, unstable nitroacetic acid intermediate. The overall yield of the desired nitroacetic acid ester is thus much higher, as loss in the second step is obviated and all inconveniences and dangers of handling the unstable nitroacetic acid are eliminated completely.

The method of the present invention essentially comprises reacting a dialkali metal salt of nitroacetic acid, e. g., the dipotassium or disodium salts, with a selected alcohol at a temperature below about 15 degrees centigrade, and preferably at a temperature below about −10 degrees centigrade. Temperatures between about −10 and −60 degrees centigrade have been found most suitable for the attainment of highest yields of desired product, but other temperatures within the prescribed range also are satisfactory in accomplishing the objectives of the present invention. A necessary component of the reaction mixture in accomplishing the objectives of the present invention is an acid stronger than nitroacetic acid. This acid may conveniently be sulfuric acid, chlorosulfonic acid, fluorosulfonic acid, hydrochloric acid, et cetera, with concentrated sulfuric acid being preferred. Such acid should be present preferably in amount of at least about one mole for each mole of dialkali metal salt, and advantageously in amount of about 2 moles of acid per each mole of salt. The reactants may be mixed together within the prescribed temperature ranges, preferably in the lower regions, the manner of admixture being of negligible importance. However, some advantages are realized by adding the strong acid to a mixture of the dialkali metal salt of nitroacetic acid and the alcohol slowly and with stirring. The mixture may conveniently be allowed to stand for a suitable period of time, e. g., 6 to 24 hours, within the lower temperature ranges, and then, if desired, allowed to rise to room temperature. The reaction product may be worked up immediately or allowed to stand for a further period of time, at the end of which reaction period the excess alcohol may be removed, as by distillation, remaining liquid diluted with a suitable solvent, e. g., ether, and neutralized with a dilute base. The organic layer, containing the ester, may then be dried, the solvent evaporated, and the ester rectified under reduced pressure to give high yields of the desired product. If desired, anhydrous sodium sulfate, anhydrous copper sulfate, or other suitable non-reactive drying agent may also be introduced into the reaction mixture to effect removal of water of esterification. In such case the sulfate of the particular alkali metal, which salt of nitroacetic acid is being employed in the process, usually precipitates, and is removed by filtration prior to removal of excess alcohol.

Representative alcohols which may be employed in the process are methanol, ethanol, propanol, butanol, isopropanol, benzyl alcohol, and the like. Representative alkali metal salts of nitroacetic acid are the dipotassium salt and the disodium salt. Representative acids which may be incorporated into the reaction mixture together with the salt of nitroacetic acid and the alcohol are sulfuric acid, chlorosulfonic acid, fluorosulfonic acid, hydrochloric acid, nitric acid, and the like. Other alcohols and acids will be found operative in carrying out the method of the present invention, and the following examples are to be understood as illustrative only of the practice of the present invention, and not to be construed as limiting.

*Example 1.—Methyl nitroacetate*

One-half mole (91 grams) of the dipotassium salt of nitroacetic acid, 500 milliliters of methanol and 10 grams of anhydrous sodium sulfate were placed in a one-liter three-neck flask and cooled to −50 degrees to −60 degrees centigrade. One mole (98 grams) of sulfuric acid (d=1.84) was added slowly with stirring. The mixture was left for 24 hours at the temperature of −50 degrees centigrade and then for six more days at room temperature. After this time the precipitated potassium sulfate was filtered off and the excess of methanol was removed by distillation. The remaining liquid was diluted with ether and neutralized with a five per cent solution of sodium carbonate. The ether layer which contained the ester was dried by calcium sulfate. The ether was then evaporated and the ester finally rectified under reduced pressure to give a 60 per cent yield of methyl nitroacetate as a colorless liquid.

*Example 2.—Ethyl nitroacetate*

One-half mole (91 grams) of the dipotassium salt of nitroacetic acid, 500 milliliters of absolute ethanol and 10 grams of anhydrous sodium sulfate were placed in a one-liter three-neck flask and cooled to between −50 degrees and −60 degrees centigrade. One mole (100 grams) of sulfuric acid (d=1.84) was added slowly with stirring. The mixture was left for 24 hours at the temperature of about −50 degrees centigrade and then for six more days at room temperature. After this time the precipitated potassium sulfate was filtered off and the excess of ethanol was removed by distillation in vacuo. The remaining liquid was diluted with ether and neutralized with a 5 per cent sodium carbonate solution. The ether layer which contained the ester was dried by calcium sulfate. The ether was then evaporated and the ester finally rectified under reduced pressure to give a 58 per cent yield of ethyl nitroacetate.

We claim:

1. A process for the production of a nitroacetic acid ester which comprises: reacting one molecular proportion of a dialkali-metal salt of nitroacetic acid with an excess of a lower aliphatic alcohol and at least two molecular proportions of concentrated sulfuric acid in the presence of an inert drying agent at a temperature between approximately −50 and −60 degrees centigrade.

2. A process for the production of a nitroacetic acid ester which comprises: reacting one molecular proportion of a dialkali-metal salt of nitroacetic acid with an excess of a lower aliphatic alcohol and at least two molecular proportions of concentrated sulfuric acid in the presence of substantially anhydrous sodium sulfate at a temperature between approximately −50 and −60 degrees centigrade.

HENRY B. HASS.
HENRY FEUER.

References Cited in the file of this patent

Steinkopf: Annalen 434, page 28 (1923).

Petyunin: Chemical Abstract 34, column 4726 (1940), Abstracting an article for Jour. Gen. Chem. (USSR), vol. 10, pp. 35–38 (1940).